United States Patent [19]
Burress et al.

[11] Patent Number: 6,139,068
[45] Date of Patent: Oct. 31, 2000

[54] UNION LOCK FOR MAINTAINING CONNECTION BETWEEN TWO CONDUITS

[75] Inventors: Tommy E. Burress, Scottsboro, Ala.; Duane A. Thompson, Buda; James V. Caroselli, Austin, both of Tex.

[73] Assignee: Advanced Micro Devices, Inc., Sunnyvale, Calif.

[21] Appl. No.: 09/112,077

[22] Filed: Jul. 8, 1998

[51] Int. Cl.[7] .................................................. F16L 55/00
[52] U.S. Cl. .............................. 285/92; 285/114; 411/192
[58] Field of Search ................................ 285/81, 91, 92, 285/114, 115, 116; 411/294, 296, 299, 941, 941.1, 192, 193, 194, 197

[56] References Cited

U.S. PATENT DOCUMENTS

| | | | |
|---|---|---|---|
| 1,532,549 | 4/1925 | Ransier | 285/114 |
| 1,599,775 | 9/1926 | Lamb et al. | 285/114 |
| 1,858,992 | 5/1932 | Hansen | 411/197 X |
| 3,807,774 | 4/1974 | Heath, Jr. . | |
| 4,109,941 | 8/1978 | Wood et al. | 285/114 X |
| 4,236,736 | 12/1980 | Anderson . | |
| 4,286,897 | 9/1981 | Bachli . | |
| 4,805,888 | 2/1989 | Bishop . | |
| 4,811,976 | 3/1989 | Yagisawa . | |
| 4,900,063 | 2/1990 | Baarfusser et al. . | |
| 4,913,468 | 4/1990 | Rattmann . | |
| 5,026,096 | 6/1991 | Lutz, II | 285/114 |
| 5,090,742 | 2/1992 | Cohen et al. | 285/114 |
| 5,094,491 | 3/1992 | Berghammer et al. . | |
| 5,139,289 | 8/1992 | Koss . | |
| 5,222,768 | 6/1993 | Hofer et al. . | |
| 5,350,201 | 9/1994 | Bynum . | |
| 5,368,337 | 11/1994 | Torres . | |
| 5,388,866 | 2/1995 | Schlosser . | |
| 5,524,936 | 6/1996 | Barr et al. . | |
| 5,931,508 | 8/1999 | Spriegel | 285/92 X |
| 6,019,558 | 2/2000 | Warren et al. | 285/92 X |

OTHER PUBLICATIONS

Merriam–Webster's Collegiate Dictionary, 10th ed., Merriam–Webster Inc., p. 1081, 1997.

*Primary Examiner*—Lynne H. Browne
*Assistant Examiner*—Greg Binda
*Attorney, Agent, or Firm*—Kevin L. Daffer; Conley, Rose & Tayon

[57] ABSTRACT

A union lock for maintaining a union between two conduits is disclosed. In a first embodiment, the union lock includes a pair of bridgepieces. Each of the bridgepieces includes an elongated member. A substantially semicircular flange is coupled to each end of the elongated members. A tab is coupled to each end of the flanges, each tab having a hole formed therein for receiving a connector. During use, the bridgepieces are placed around the conduits and secured to each other by placing the connectors in the holes in the tabs. By tightening the connectors, the elongated members may be compressed against the conduits and against a union nut joining the conduits, thus maintaining the union. In a second embodiment, the union lock includes a pair of elongated members. A substantially circular flange is coupled to each end of the elongated members. A tab is coupled to each end of the flanges, each tab having a hole formed therein for receiving a connector. During use, the union lock may be placed around a pair of conduits and the connectors may be placed in the holes in the tabs. By tightening the connectors, the elongated members and the flanges may be compressed against the conduits and against a union nut joining the conduits, thus maintaining the union. The two embodiments differ from each other primarily in that the first embodiment exists as two bridgepieces, whereas the second embodiment exists as a single piece.

20 Claims, 4 Drawing Sheets

UNION LOCK FOR MAINTAINING CONNECTION BETWEEN TWO CONDUITS

BACKGROUND OF THE INVENTION

1. Field of the Invention

This invention relates to a removable locking device for maintaining a union between two conduits. The locking device forms an engagement with the two conduits and a union nut connecting the conduits to substantially prevent disengagement of the union during use.

2. Description of the Relevant Art

Frequently, manufacturing processes require fabrications of piping for carrying, e.g., chemical reactants, waste streams, or fluids for heating and cooling. For purposes of this application, a "fabrication" is an assembly of a plurality of sections of piping. The sections of piping need not be the same length. In an embodiment, a fabrication may be a substantially linear structure including sections of substantially straight piping. Alternatively, a fabrication may include sections of piping having curved portions and/or bends of various angles formed therein. In still another embodiment, a fabrication may include both substantially straight and curved or bent sections.

In a conventional type of end-to-end joint for two conduits, the end of one conduit is provided with an external threading and the end of the other conduit is provided with a lip or flange. The flange can be abutted by a lip of a union nut so that axial drawing together of the two conduits may be obtained by tightening the union nut onto the threaded conduit portion. A resiliently compressible seal element, such as an O-ring, may be placed between the end faces of the respective portions to form a fluid-tight engagement between the conduit sections.

The piping often carries hazardous materials (e.g., corrosive, caustic or toxic materials). Often, the materials are also heated to very high temperatures. Such piping may also be used for steam or hot water. As such, it is imperative that leaks not form in the unions so that workers may be protected from accidental exposure to the hazards. Further, a leak of even non-hazardous materials, such as chilled water from a cooling line, may damage expensive processing equipment (e.g., by causing an electrical short) and shut down a processing line, resulting in significant economic losses.

As such, it is desirable to ensure that unions between conduits will not come apart due to, e.g., vibration, expansion, or contraction of the conduits and the union nut or accidental jostling of the union by a worker. It is preferred to weld the conduits upon installation to prevent union failure. Welding, however, may not always be possible. For example, the spacing between neighboring (e.g., parallel or adjacent) conduits may be such that welding is impractical or prohibited. Therefore, it would be desirable to implement an alternative means of ensuring that unions between conduits are maintained during use.

SUMMARY OF THE INVENTION

The problems outlined above are in large part solved by a union lock for maintaining a mechanical union between two conduits. In the context of this application, a "conduit" should be understood to include any substantially elongated member forming an enclosed space through which liquids, gases, and other fluids may flow. "Conduit" may include both rigid tubing such as a pipe and flexible tubing such as a hose. In one embodiment, the union lock includes a pair of bridgepieces. Each of the bridgepieces preferably includes an elongated member with an arcuate flange coupled to each end of the elongated member. The elongated member preferably includes an angled portion configured to fit over a union nut joining two sections of a conduit. Each of the arcuate flanges preferably includes a curved section through which the flange is coupled to the elongated member. Preferably, the curved sections are substantially semicircular in shape and encompass a span of approximately 180°. A tab is preferably coupled to each end of the curved sections. Each of the tabs preferably includes a hole formed therein through which a connector may be inserted to form an engagement between the bridgepieces. The union lock is preferably made of a material that combines strength and durability with flexibility and economy. Examples of suitable materials include stainless steel, carbon steel, and titanium.

During use, the bridgepieces may be placed around the conduit such that the holes in the tabs are aligned with one another. A connector may be inserted in sequence through the hole in a tab of the first bridgepiece and the corresponding hole in a tab of the second bridgepiece. Preferably, the connector includes a portion having a diameter larger than the diameter of the holes such that the connector is prevented from passing completely through the holes. In an embodiment, the connector includes a screw, a nut, and a washer. The screw may include a shaft having a first diameter with a head having a second diameter greater than the first diameter attached thereto. The screw may be inserted in sequence into the holes in the tabs of the first and second bridgepieces. The washer and the nut may then be placed on the end of the screw protruding from the hole in the tab on the second bridgepiece and tightened. Tightening the nut onto the screw will preferably compress the bridgepieces against one another as well as against the conduits and the union nut against which they are placed. The resulting engagement will preferably inhibit rotation of the union nut and prevent the union from separating or failing under conditions of, e.g., vibration or expansion. Each of the bridgepieces may further include a pad configured to contact the union nut during use. Contact between the pad and the union nut may further inhibit rotation of the union nut during use, thus maintaining the union between the conduits.

In an alternative embodiment, the union lock may include a pair of elongated members joined at each end by an arcuate flange. In this embodiment, the arcuate flanges may be substantially circular, extending through approximately 360° but not forming a closed loop. The bridgepieces may be coupled to the flanges such that the bridgepieces are opposite one another (i.e., separated from each other by approximately 180°). The flanges may have a tab at each end, with each of the tabs having a hole formed therethrough. Rather than existing as two separate pieces, as does the union lock described in the previous embodiment, the union lock of the present embodiment preferably forms a single component.

Preferably, the flanges are sufficiently flexible that the ends may be separated from one another to facilitate placement of the union lock around a conduit. Connectors may be inserted into the holes and tightened to form an engagement between the tabs at each end of the connectors and between the union lock and the conduits. The connectors may be similar to the connectors described previously. Each elongated member may include a pad coupled thereto to further facilitate engagement between the union lock and the union nut. Preferably, the union lock is made of a material such as titanium, stainless steel, or carbon steel as described previously.

BRIEF DESCRIPTION OF THE DRAWINGS

Other objects and advantages of the invention will become apparent upon reading the following detailed description and upon reference to the accompanying drawings in which.

Figure 1A:
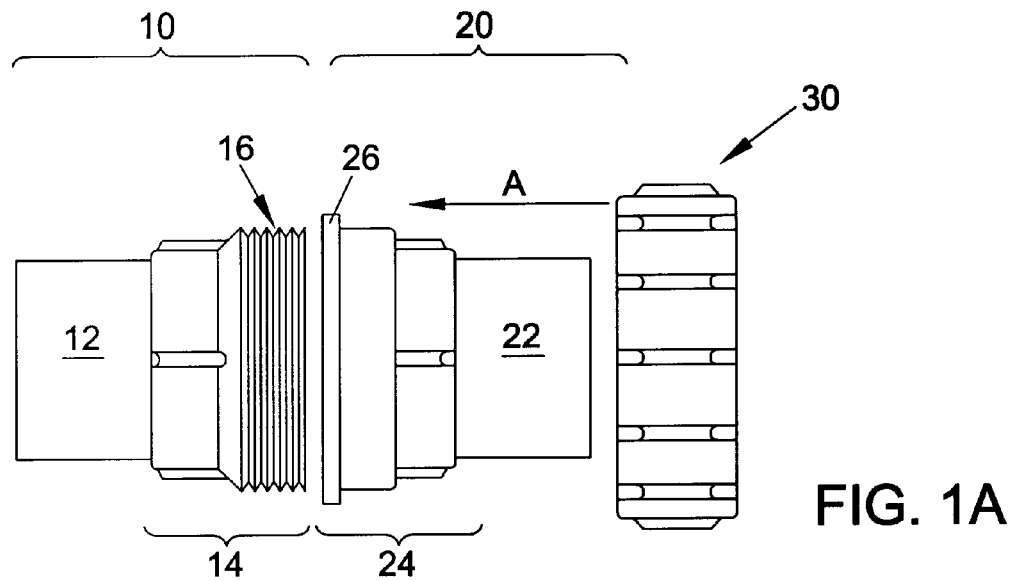
FIGS. 1A, 1B, and 1C illustrate formation of a union between two conduits.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE DRAWINGS

Figure 1B:
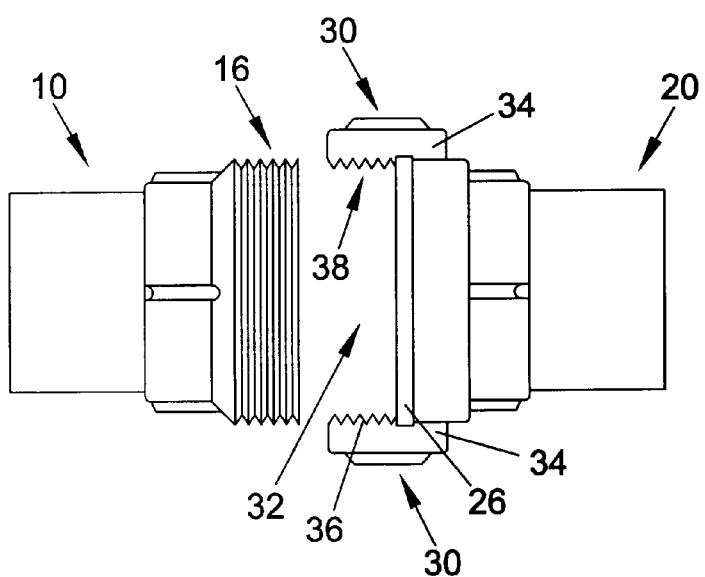
Figure 1C:
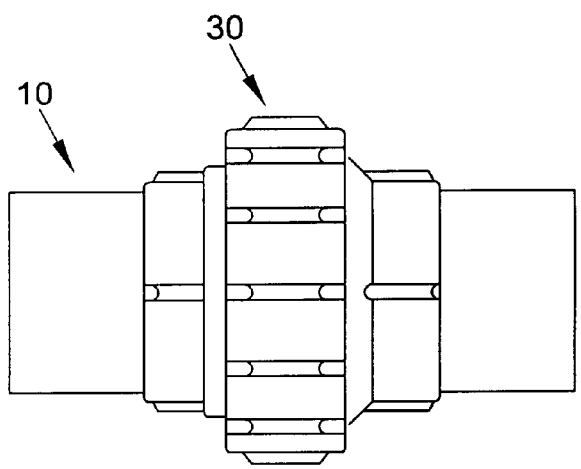

Turning now to the drawings, FIGS. 1A–1C illustrate the formation of a union between two conduits. Conduit 10 preferably includes a first section 12 having a first outer diameter and a second section 14 having a second outer diameter greater than the first outer diameter. Second section 14 preferably includes threaded portion 16. Conduit 20 preferably includes a third section 22 and a fourth section 24. Fourth section 24 is preferably unthreaded and includes a flange 26. An outer diameter of flange 26 is preferably substantially similar to an outer diameter of threaded portion 16 of first conduit 10. Union nut 30 preferably has a hole formed therethrough, the hole having a diameter greater than an outer diameter of third section 22 of conduit 20 such that union nut 30 may move axially along conduit 20, as shown by arrow A in FIG. 1A. Union nut 30 is shown in cross-sectional view in FIG. 1B positioned on second conduit 20. A lip 34 preferably extends into hole 32 such that union nut 30 may not pass over flange 26. An inner surface 36 of hole 32 preferably includes threading 38 that is complementary to threading 16 of first conduit 10 such that an engagement, depicted in FIG. 1C, may be formed between conduit 10 and union nut 30. In an embodiment, an O-ring (not shown) may be inserted between threaded section 16 and flange 26 to form a seal between the conduits during use.

Figure 2:
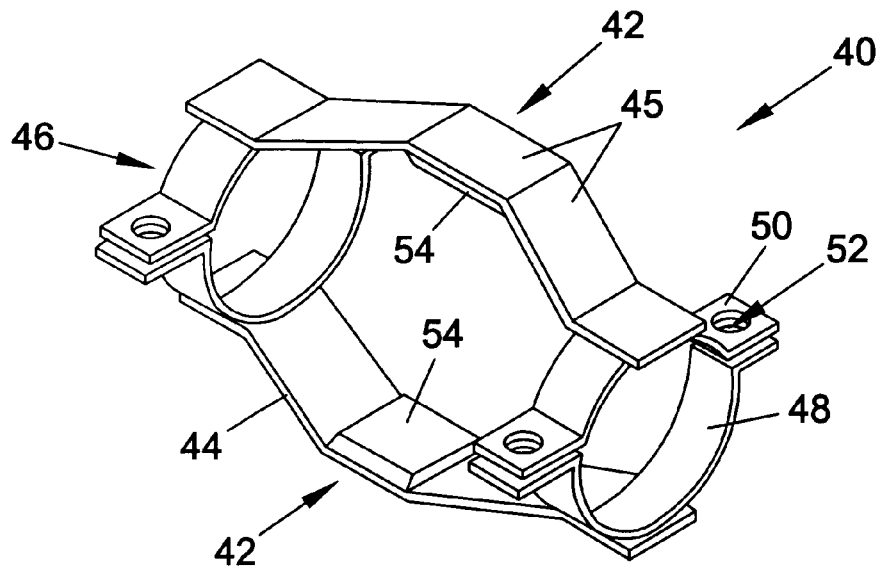
FIG. 2 is a perspective view of a union lock according to an embodiment of the invention.

FIG. 2 illustrates a perspective view of one embodiment of a union lock. Union lock 40 may include a pair of bridgepieces 42. Bridgepiece 42 preferably includes elongated member 44 coupled at each end to an arcuate flange 46. Elongated member 44 may be coupled to flange 46 by, e.g., a weld. Elongated member 44 is preferably configured to fit over union nut 30 during use; in an embodiment, elongated member 44 may include a series of sections 45 oriented at an angle to one another. A pad 54 may be attached to elongated member 44 (via, e.g., a weld). Pad 54 may contact union nut 30 during use to form an engagement between union lock 40 to prevent disengagement of the union (see FIG. 6).

Figure 3A:
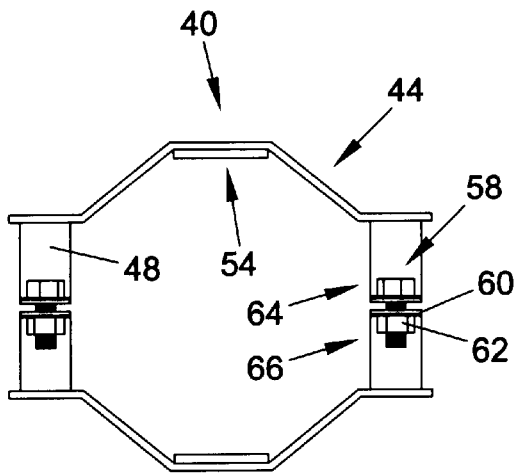
FIGS. 3A and 3B are side and end views, respectively, of the union lock of FIG. 2.
Figure 3B:
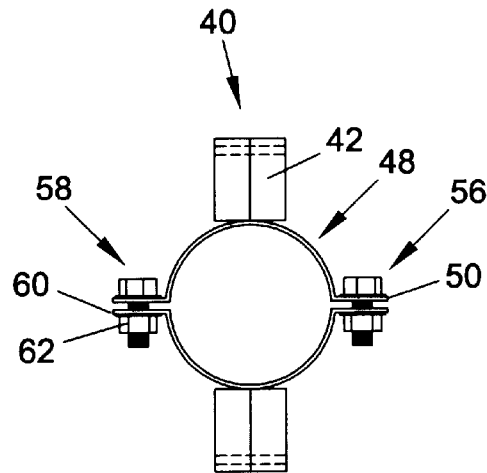

Flange 46 preferably includes a curved portion 48 through which the flange is coupled to elongated member 44. Curved portion 48 preferably is substantially semicircular in shape and extends through approximately 180°. A tab 50 is preferably formed at each end of curved portion 48. Tab 50 preferably has a hole 52 formed therein through which a connector (such as connector 56, depicted in FIGS. 3A and 3B) may be inserted. As depicted in FIGS. 3A and 3B, connector 56 includes a screw 58, a washer 60, and a nut 62. Shaft 66 of screw 58 may be inserted through the holes in tabs 50. Preferably, screw 58 includes a head 64 having a diameter greater than a diameter of the holes to prevent the screw from passing completely thorough the holes. Washer 60 and nut 62 may then be placed on the end of shaft 66 and nut 62 tightened to form an engagement between the two bridgepieces.

Figure 4:
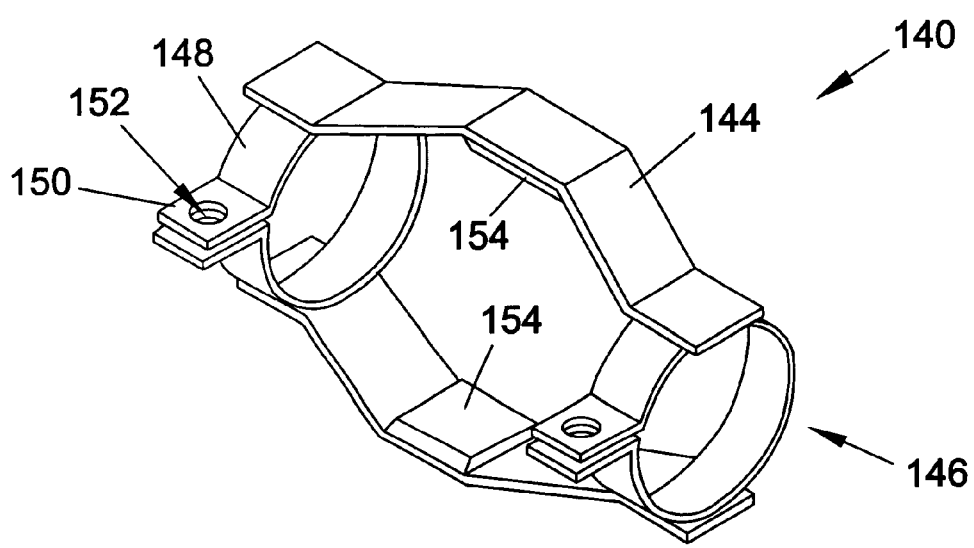
FIG. 4 is a perspective view of a union lock according to an alternate embodiment of the invention.
Figure 5:
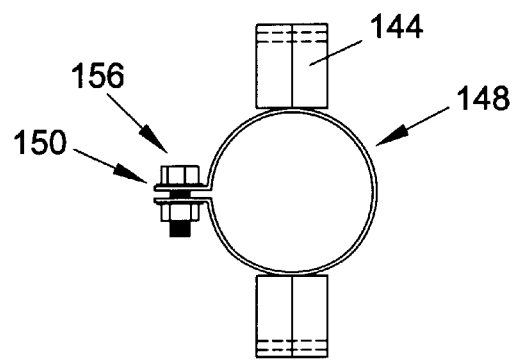
FIG. 5 is an end view of the union lock of FIG. 4.

Turning now to FIG. 4, an alternate embodiment of a union lock is depicted. Union lock 140 includes a pair of elongated members 144 coupled at each end to an arcuate flange 146. Elongated member 144 is preferably configured to fit over union nut 30 during use. A pad 154 may be attached to elongated member 144 to form an engagement between union lock 140 and the union nut to prevent rotation of the union nut (see FIG. 6). Arcuate flange 146 preferably includes curved portion 148 through which the flange is coupled to elongated member 144. Curved portion 148 preferably is substantially circular in shape and extends through approximately 360° without, however, forming a closed loop. A tab 150 is preferably formed at each end of curved portion 148. Tab 150 preferably has a hole 152 formed therein through which a connector (such as connector 156, depicted in FIG. 5) may be inserted. Union lock 140 may be substantially similar to union lock 40 (FIG. 2) in materials and construction. Connector 156 may be substantially similar to connector 56 depicted in FIGS. 3A and 3B and may be tightened to form an engagement between tabs 150 of union lock 140.

Figure 6:
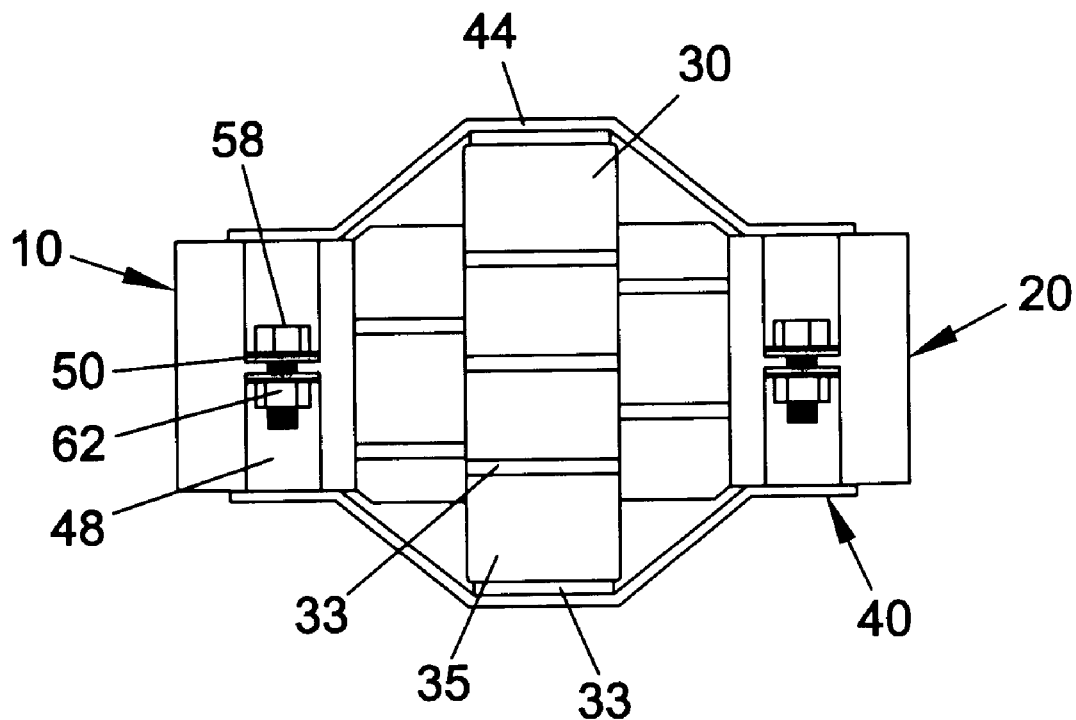
FIG. 6 is a side view of a union lock according to either embodiment of the present invention in use.

FIG. 6 depicts a union lock according to either of the embodiments described herein in use. Although FIG. 6 will be described in terms of union lock 40, the description should be understood to apply equally to union lock 140. As depicted in FIG. 6, conduits 10 and 20 have been joined by union nut 30. Union lock 40 has been placed around first conduit 10, second conduit 20, and union nut 30. An engagement has been formed by inserting screws 58 though the holes in tabs 50, placing washers 60 on shafts 66 of the screws, and tightening nuts 62 onto the screws. Tightening the nuts preferably compresses curved portions 48 against the conduits to form the engagement between conduits 10 and 20 and union lock 40. In an embodiment, union nut 30 includes projections 33 spaced around an exterior surface of the union nut. In embodiments including a pad such as pad 54 (see FIG. 2) attached to elongated member 44, the pad (not visible in FIG. 6) is preferably configured to fit in space 35 between projections 33 to form an engagement between union lock 40 and union nut 30 to further inhibit rotation of the union nut and to maintain the union between the conduits.

It will be appreciated to those skilled in the art having the benefit of this disclosure that this invention is believed to provide a union lock for maintaining a union between two conduits and a method for forming the union. Further modifications and alternative embodiments of various aspects of the invention will be apparent to those skilled in the art in view of this description. For example, the union lock described herein may be used to join either flexible conduits (e.g., hoses) as well as rigid conduits (e.g., pipes).

In addition, the union lock described herein may be used in applications other than industrial settings (e.g., heating and air conditioning units and engines). It is intended that the following claims be interpreted to embrace all such modifications and changes and, accordingly, the specification and drawings are to be regarded in an illustrative rather than a restrictive sense.

What is claimed is:

1. A union locking mechanism for preventing disengagement of a union between two conduits, comprising:
   an elongated member comprising:
      a first end and a second end, the first end and the second end each being coupled to an arcuate flange, and wherein each of the arcuate flanges is configured to fit around a portion of one of the conduits;
      an intermediate portion extending continuously between the first and second ends; and
   a pad affixed to the intermediate portion of the elongated member.

2. The union locking mechanism of claim 1, wherein the locking mechanism comprises a material selected from the group consisting of titanium, stainless steel, and carbon steel.

3. The union locking mechanism of claim 1, further comprising the pad affixed to a conduit-facing side of the elongated member.

4. The union locking mechanism of claim 3, wherein the pad is configured to form an engagement with the union.

5. The union locking mechanism of claim 4, wherein the pads is configured to engage a union nut of the union such that movement of the union nut with respect to the conduits is substantially inhibited.

6. The union locking mechanism of claim 1, wherein the elongated member is a first elongated member and the pad is a first pad, and further comprising:
   a second elongated member comprising:
      a first end and a second end, wherein the first end and the second end are each coupled to an arcuate flange; and wherein each of the arcuate flanges is configured to fit around a portion of one of the conduits;
      an intermediate portion extending continuously between the first and second ends of the second elongated member; and
   a second pad affixed to the intermediate portion of the second elongated member.

7. The union locking mechanism of claim 1, further comprising a plurality of connectors, wherein each of the connectors is configured to form a fixable engagement with the arcuate flanges during use.

8. The union locking mechanism of claim 7, wherein each of the arcuate flanges has a pair of holes formed therein, and wherein the connectors are configured to be inserted within the holes during use to form the fixable engagement.

9. The union locking mechanism of claim 7, wherein the connectors comprise screws.

10. The union locking mechanism of claim 7, wherein each of the plurality of connectors comprises:
    a screw;
    a washer; and
    a nut.

11. The union locking mechanism of claim 7, wherein each of the arcuate flanges comprises:
    a substantially semicircular member, wherein the substantially semicircular member extends between a first end and a second end through an angle of approximately 180°; and
    a tab coupled to each end of the substantially semicircular member, wherein each of the tabs has a hole formed therein, and wherein the connectors are configured to be inserted within the holes during use to form the fixable engagement.

12. The union locking mechanism of claim 7, wherein each of the arcuate flanges comprises:
    a substantially circular member, wherein the substantially circular member extends between a first end and a second end through an angle of approximately but less than 360°; and
    a tab coupled to each of the ends of the substantially circular member, wherein each of the tabs has a hole formed therein, and wherein the connectors are configured to be inserted within the holes during use to form the fixable engagement.

13. A system of rigid piping, comprising:
    a first conduit;
    a second conduit;
    a union nut joining the first conduit to the second conduit; and
    a union lock for preventing disengagement of the first conduit from the second conduit, wherein the union lock comprises:
       a first elongated member, comprising:
          a first end and a second end wherein the first end and the second end are each coupled to an arcuate flange; and wherein each of the arcuate flanges is configured to fit around a portion of one of the conduits;
          an intermediate portion extending continuously between the first and second ends of the first elongated member;
       a first pad affixed to the intermediate portion of the first elongated member;
       a second elongated member, comprising:
          a first end and a second end, the first end and the second end each being coupled to an arcuate flange, and wherein each of the arcuate flanges is configured to fit around a portion of one of the conduits;
          an intermediate portion extending continuously between the first and second ends of the second elongated member; and
       a second pad affixed to the intermediate portion of the second elongated member.

14. The system of claim 13, further comprising a plurality of connectors, wherein each of the connectors is configured to form a fixable engagement with the arcuate flanges during use.

15. The system of claim 14, wherein each of the arcuate flanges has a pair of holes formed therein, and wherein the connectors are configured to be inserted within the holes during use to form the fixable engagement.

16. The system of claim 14, wherein each of the arcuate flanges comprises:
    a substantially semicircular member, wherein the substantially semicircular member extends between a first end and a second end through an angle of approximately 180°; and
    a tab coupled to each end of the substantially semicircular member, wherein each of the tabs has a hole formed therein, and wherein the connectors are configured to be inserted within the holes during use to form the fixable engagement.

17. The system of claim 14, wherein each of the arcuate flanges comprises:

a substantially circular member, wherein the substantially circular member extends between a first end and a second end through an angle of approximately but less than 360°; and a tab coupled to each of the ends of the substantially circular member, wherein each of the tabs has a hole formed therein, and wherein the connectors are configured to be inserted within the holes during use to form the fixable engagement.

18. The system of claim 13, wherein each of the pads forms an engagement with the union nut such that movement of the union nut with respect to the conduits is substantially inhibited.

19. The system of claim 13, wherein the system is selected from the group consisting of steam lines, hot water lines, and chilled water lines.

20. The system of claim 13, wherein the system is selected from the group consisting of corrosive materials lines, caustic materials lines, and toxic materials lines.

* * * * *